(12) United States Patent
Sugata (10) Patent No.: US 12,013,013 B2
(45) Date of Patent: Jun. 18, 2024

(54) GEAR MECHANISM AND GEAR

(71) Applicant: TOYOTA JIDOSHA KABUSHIKI KAISHA, Toyota (JP)

(72) Inventor: Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 17/514,535

(22) Filed: Oct. 29, 2021

(65) Prior Publication Data

US 2022/0136588 A1 May 5, 2022

(30) Foreign Application Priority Data

Nov. 2, 2020 (JP) ................................. 2020-183507

(51) Int. Cl.
*F16H 1/32* (2006.01)
*F16H 55/08* (2006.01)
*F16H 55/16* (2006.01)

(52) U.S. Cl.
CPC ........... *F16H 1/32* (2013.01); *F16H 55/0833* (2013.01); *F16H 55/16* (2013.01)

(58) Field of Classification Search
CPC ........ F16H 1/32; F16H 55/0833; F16H 55/16; F16H 55/17
See application file for complete search history.

(56) References Cited

U.S. PATENT DOCUMENTS

| 2009/0078066 A1 | 3/2009 | Schuler |
| 2010/0004087 A1 | 1/2010 | Minegishi et al. |
| 2012/0258835 A1 | 10/2012 | Kataoka et al. |
| 2018/0156314 A1* | 6/2018 | Salisbury .................. F16H 1/32 |
| 2018/0320759 A1 | 11/2018 | Tsai et al. |
| 2020/0132166 A1 | 4/2020 | Chung et al. |
| 2020/0232542 A1 | 7/2020 | Chung et al. |
| 2021/0088078 A1* | 3/2021 | Sun ....................... F16C 33/585 |

(Continued)

FOREIGN PATENT DOCUMENTS

| CN | 115199727 A | * 10/2022 | ........... F16H 57/023 |
| DE | 102004037540 A1 | 3/2006 | |

(Continued)

OTHER PUBLICATIONS

Machine translation of WO 2015141387A1, Suzuki et al., Sep. 24, 2015 (Year: 2015).*

(Continued)

*Primary Examiner* — Vinh Luong
(74) *Attorney, Agent, or Firm* — Dinsmore & Shohl LLP (57) ABSTRACT

A gear mechanism includes a gear including external teeth, the external teeth including a plurality of tooth parts defined by a cycloid curve, a plurality of contacting members disposed on an outer side and in a circumferential direction of the external teeth, the external teeth being brought into pressure contact with the plurality of contacting members, and a mechanism configured to eccentrically move the gear. A plurality of through holes penetrating the gear in a thickness direction of the gear are formed in the gear in the circumferential direction of the gear, the cycloid curve extends outward from an ideal cycloid curve without the external teeth interfering with the plurality of contacting members, the plurality of contacting members being in contact with the ideal cycloid curve.

6 Claims, 9 Drawing Sheets

(56) References Cited

U.S. PATENT DOCUMENTS

2022/0081063 A1* 3/2022 Mercat ................... B62M 11/14
2022/0196123 A1* 6/2022 Sugata ................... F16H 13/08

FOREIGN PATENT DOCUMENTS

| | | |
|---|---|---|
| DE | 102006023535 B4 | 12/2008 |
| JP | S55-098849 U | 7/1980 |
| JP | S56-094061 A | 7/1981 |
| JP | S58-056250 U | 4/1983 |
| JP | 2000-220699 A | 8/2000 |
| JP | 2003-184995 A | 7/2003 |
| JP | 2005-201308 A | 7/2005 |
| JP | 2012-219908 A | 11/2012 |
| JP | 6554578 B2 | 7/2019 |
| WO | 2008/096747 A1 | 8/2008 |
| WO | WO 2015141387 A1 * | 9/2015 ............... F16H 1/32 |

OTHER PUBLICATIONS

Machine translation of CN 115199727A, Jin et al., Oct. 18, 2022 (Year: 2022).*
Define cycloid curve, Microsoft Bing, Dec. 4, 2023 (Year: 2023).*
Translation of Japanese Patent Office, Notice of Reasons for Refusal, Japanese Patent Appl. No. 2020-183507, Date of Drafting Jul. 24, 2023, available in Global Dossier on Aug. 1, 2023 (Year: 2023).*

* cited by examiner

GEAR MECHANISM AND GEAR

CROSS REFERENCE TO RELATED APPLICATIONS

This application is based upon and claims the benefit of priority from Japanese patent application No. 2020-183507, filed on Nov. 2, 2020, the disclosure of which is incorporated herein in its entirety by reference.

BACKGROUND

The present disclosure relates to a gear mechanism and a gear, and more particularly to a gear mechanism using a gear capable of eccentrically rotating while external teeth defined by a cycloid curve are always in contact (pressure contact) with a plurality of contacting members and the gear.

A two-stage cycloidal speed reducer has been proposed (see, for example, Japanese Patent No. 6554578). In this cycloidal speed reducer, in theory, by using a gear having external teeth defined by an ideal cycloid curve, the gear can eccentrically rotate with the external teeth always in contact with a plurality of contacting members (pins).

SUMMARY

However, in practice, it is not possible to realize a gear having external teeth defined by a mathematically ideal cycloid curve which can be in contact with contacting members (pins) without interfering with the contacting members due to machining accuracy (tolerance) of the teeth, deformation due to thermal expansion of the metal, etc. When the manufactured external teeth (a cycloid tooth profile) are formed inside the ideal cycloid curve, the external teeth cannot be always in constant contact with the contacting members (pins), and therefore backlash occurs on an output shaft side. Noise is generated by repeating contact and non-contact between the external teeth and the contacting members (pins). Furthermore, when the manufactured external teeth (the cycloid tooth profile) are formed outward from the ideal cycloid curve, the contacting members (pins) interferes with the external teeth, and thus the gear cannot rotate. This problem is more pronounced for a two-stage cycloidal speed reducer with fewer teeth.

The present disclosure has been made in order to solve such a problem, and provides a gear mechanism using a gear capable of eccentrically rotating while external teeth defined by a cycloid curve are always in contact (pressure contact) with a plurality of contacting members and the gear.

According to an example aspect of the present disclosure, a gear mechanism includes: a gear including external teeth, the external teeth including a plurality of tooth parts defined by a cycloid curve; a plurality of contacting members disposed on an outer side and in a circumferential direction of the external teeth, the external teeth being brought into pressure contact with the plurality of contacting members; and a mechanism configured to eccentrically move the gear. In order to elastically deform the gear by the pressure contact, a plurality of through holes penetrating the gear in a thickness direction of the gear are formed in the gear in the circumferential direction of the gear, the cycloid curve extends outward from an ideal cycloid curve without the external teeth interfering with the plurality of contacting members, the plurality of contacting members being in contact with the ideal cycloid curve, and the gear is eccentrically rotated while being elastically deformed in a state in which the external teeth are always pressed against the plurality of contacting members.

With such a configuration, the gear can be eccentrically rotated while the external teeth defined by the cycloid curve are always in contact (pressure contact) with a plurality of contacting members.

This is because that the external teeth defined by the cycloid curve projecting outward from the ideal cycloid curve, which are in contact with the plurality of contacting members, are included, and the plurality of through holes penetrating the gear in the thickness direction of the gear are formed in the gear in the circumferential direction of the gear in order to elastically deform the gear by the pressure contact.

Here, the through holes may be formed near the external teeth.

The through hole may be such that stress generated by the elastic deformation becomes substantially constant regardless of positions of the external teeth which are brought into contact with the contacting member while the gear is eccentrically rotated.

The plurality of through holes may include first through holes formed in the tooth parts.

The plurality of through holes may include second through holes formed in tooth bottom parts between the tooth parts adjacent to each other.

The plurality of through holes may include first through holes formed in the tooth parts and second through holes formed in tooth bottom parts between the tooth parts adjacent to each other.

The second through hole may include a first hole part and a second hole part communicating with each other, the first hole part may be formed in the tooth bottom part, in a radial direction of the gear, the second hole part may be located at an inner side than the first through hole, and in the circumferential direction of the gear, the second hole part may extend toward a center of the first through hole formed on both sides of the first hole part in the circumferential direction of the gear.

Another example aspect of the present disclosure is a gear including external teeth, the external teeth including a plurality of tooth parts defined by a cycloid curve and the external teeth being brought into pressure contact with a plurality of contacting members disposed on an outer side and in a circumferential direction of the external teeth. A plurality of through holes penetrating the gear in a thickness direction of the gear are formed in the gear in the circumferential direction of the gear in order to elastically deform the gear by the pressure contact. The cycloid curve extends outward from an ideal cycloid curve without the external teeth interfering with the plurality of contacting members which is in contact with the ideal cycloid curve.

With such a configuration, the gear can be eccentrically rotated while the external teeth defined by the cycloid curve are always in contact (pressure contact) with a plurality of contacting members.

This is because that the external teeth defined by the cycloid curve projecting outward from the ideal cycloid curve, which are in contact with the plurality of contacting members, are included, and the plurality of through holes penetrating the gear in the thickness direction of the gear are formed in the gear in the circumferential direction of the gear in order to elastically deform the gear by the pressure contact.

According to the present disclosure, it is possible to provide a gear mechanism and a gear using a gear capable of eccentrically rotating while external teeth defined by a cycloid curve are always in contact (pressure contact) with a plurality of contacting members and the gear.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, a gear mechanism according to an embodiment of the present disclosure will be described with reference to the attached drawings. In each of the drawings, the corresponding components are denoted by the same reference signs, and repeated descriptions are omitted.

The gear mechanism of the present embodiment is a gear mechanism including a mechanism for transmitting power by contacting a plurality of contacting members (e.g., outer peripheral pins) disposed outer side and in a circumferential direction of the external teeth and the external teeth of the gear with each other.

<Gear Configuration>

First, a gear 10 used for the cycloidal speed reducer 1 will be described.

Figure 1:
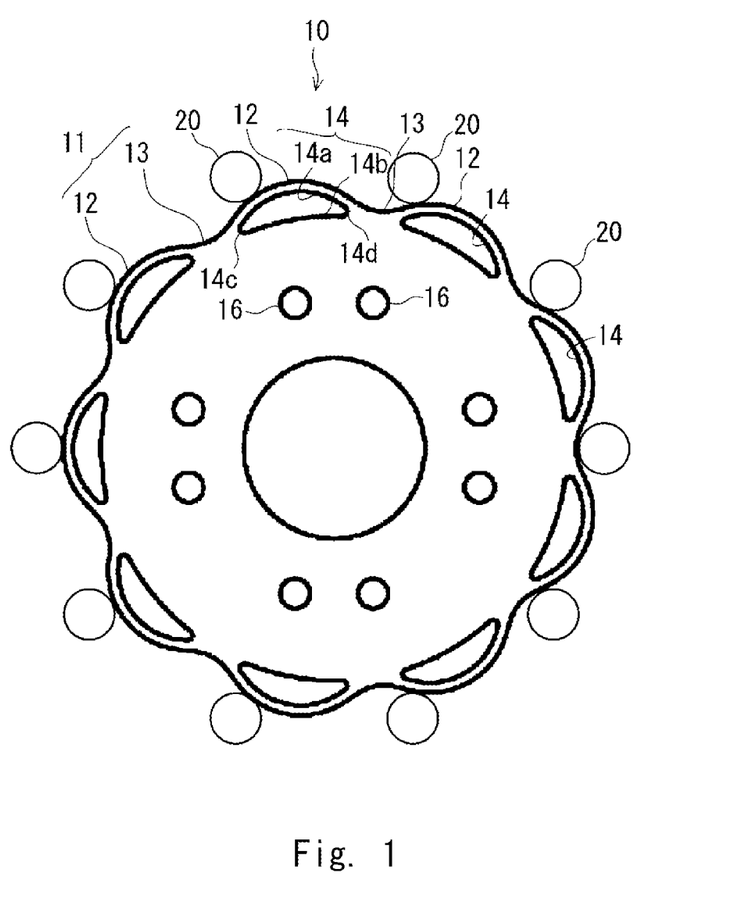
FIG. 1 is a plan view of a gear 10.

FIG. 1 is a plan view of the gear 10.

The gear 10 includes external teeth 11 defined by a cycloid curve (anq epitrochoid curve). That is, a tooth profile of the gear 10 is a cycloid tooth profile. The external teeth 11 include a plurality of tooth parts 12 and tooth bottom parts 13 between the tooth parts 12 which are adjacent to each other.

The external teeth 11 are defined by a cycloid curve projecting outward from an ideal cycloid curve as described later. Thus, the external teeth 11 are brought into pressure contact with a plurality of outer peripheral pins 20 arranged outer side and in the circumferential direction of the external teeth 11.

In order to elastically deform the gear 10 by this pressure contact, a plurality of through holes 14 penetrating in a thickness direction of the gear 10 (a direction orthogonal to a paper surface in FIG. 1) are formed in the circumferential direction of the gear 10. In FIG. 1, a reference numeral 16 denotes a through hole through which a connecting column 211 described later passes.

The material of the gear 10 is, for example, carbon steel for machine structures (e.g., S45C). The gear 10 is manufactured, for example, by cutting a material (e.g., carbon steel for machine structures). The gear 10 may be manufactured by press punching or casting a material. A specific configuration of the gear 10 will be described later.

<Reasons for Using Cycloid Curve Extending Outward from Ideal Cycloid Curve>

The cycloid curve defining the external teeth 11 of the gear 10 is not an ideal (mathematically ideal) cycloid curve and instead is a cycloid curve projecting outward from the ideal cycloid curve. The reason for this will be explained below.

In theory, a gear having external teeth defined by an ideal cycloidal curve can be eccentrically rotated while the external teeth are always in contact with a plurality of peripheral pins. In this way, the torque is received in all the tooth parts, and a high torque capacity can be achieved.

However, in practice, a gear having external teeth defined by an ideal cycloid curve cannot be achieved due to machining accuracy (tolerance) of the gear (external teeth) or the like. Therefore, when the external teeth 11 are defined by the ideal cycloid curve, the gear 10 cannot be eccentrically rotated while the external teeth 11 are always in contact with the plurality of outer peripheral pins 20.

In order to address this issue, in order to make the external teeth 11 always be in contact (press contact) with the plurality of outer peripheral pins 20, the external teeth 11 are defined not by the ideal cycloid curve but by a cycloid curve projecting outward from the ideal cycloid curve.

<Reason for Forming Through Holes in Gear>

The material of the gear 10 is a rigid body, for example, a carbon steel material for machine structures (e.g., S45C). Therefore, a gear having the external teeth 11 defined by the cycloid curve projecting outward from the ideal cycloid curve cannot be eccentrically rotated, because the external teeth press against (interfere with) the outer peripheral pins when the gear is to eccentrically rotate.

Therefore, the through holes 14 are formed in the gear 10 so that the gear 10 is elastically deformed by the pressure contact.

As described above, the external teeth 11 are defined not by the ideal (mathematically ideal) cycloid curve but by the cycloid curve projecting outward from the ideal cycloid curve, and the through holes 14 are formed in the gear 10 so that the gear 10 is elastically deformed by the pressure contact. In this manner, the gear 10 can be eccentrically rotated while being elastically deformed in a state in which the external teeth 11 are always in contact (pressure contact) with the plurality of outer peripheral pins 20.

<Ideal Cycloid Curve>

Next, the ideal cycloid curve will be described.

The ideal cycloid curve can be calculated by the following Formula 1 using an intervening variable t, where N is the number of outer peripheral pins 20, $r_b$ is a distance from a rotation axis on which the outer peripheral pins 20 are arranged, and $r_{pin}$ is a radius of the outer peripheral pin 20.

[Formula 1]

$$X(t) = x(t) - \frac{r_{pin}\dot{y}(t)}{\sqrt{\dot{x}(t)^2 + \dot{y}(t)^2}} \\ Y(t) = y(t) - \frac{r_{pin}\dot{x}(t)}{\sqrt{\dot{x}(t)^2 + \dot{y}(t)^2}}$$ (Formula 1)

However, each variable in Formula 1 can be calculated by the following Formulas 2 and 3.

[Formula 2]

$$\dot{x}(t) = -(r_c + r_m)\sin(t) + r_d\left(\frac{r_c + r_m}{r_m}t\right)\sin\left(\frac{r_c + r_m}{r_m}t\right)$$
$$\dot{y}(t) = -(r_c + r_m)\cos(t) + r_d\left(\frac{r_c + r_m}{r_m}t\right)\cos\left(\frac{r_c + r_m}{r_m}t\right)$$

(Formula 2)

[Formula 3]

$$x(t) = (r_c + r_m)\cos(t) - r_d\cos\left(\frac{r_c + r_m}{r_m}t\right)$$
$$y(t) = (r_c + r_m)\sin(t) - r_d\sin\left(\frac{r_c + r_m}{r_m}t\right)$$

(Formula 3)

Here, Formula 2 indicates a cycloid curve when the thickness of the outer peripheral pin 20 is 0. The above Formula 3 indicates a direction vector for offsetting the curve inward by the thickness of the outer peripheral pin 20. By offsetting the thickness of the outer peripheral pin 20 using the Formula 3 with respect to the Formula 2, Formula 1 representing the ideal cycloid curve which is brought into contact with the outer peripheral pins 20 is obtained. Note that $r_m = r_b/N$, and $r_c = r_b(N-1)/N$.

<Cycloid Curve Projecting Outward from Ideal Cycloid Curve>

Next, the cycloid curve extending outward from the ideal cycloid curve will be described.

The cycloid curve projecting outward from the ideal cycloid curve can be calculated by the above Formula 1 using a value obtained by subtracting a projecting amount D from the actual radius of the outer peripheral pin 20 as the radius $r_{pin}$ of the outer peripheral pin 20 in the above Formula 1. For example, when the machining accuracy of the gear 10 (the external teeth 11) is ±50 μm, the projecting amount D is 50 μm.

<Through Holes Formed in Gear>

Next, the through holes 14 formed in the gear 10 will be described in detail.

It is desirable that the through holes 14 be formed so as to satisfy at least the following three conditions (satisfy the conditions as much as possible).

The first condition is that during eccentric rotation of the gear 10, the external teeth 11 are brought into pressure contact with the outer peripheral pins 20, whereby the gear 10 is elastically deformed. In order to satisfy this condition, it is desirable that the through holes 14 be formed near the external teeth 11. For example, the through holes 14 are desirably provided in the tooth parts 12 (see FIG. 1).

The second condition is that, during the eccentric rotation of the gear 10, the stress (or a force by which the gear 10 presses the outer peripheral pins 20 by an elastic force for returning the elastically deformed gear to the shape of the gear 10 before elastically deformed) generated by the elastic deformation is substantially constant regardless of the positions of the external teeth 11 which are brought into pressure contact with the outer peripheral pins 20.

Figure 2:
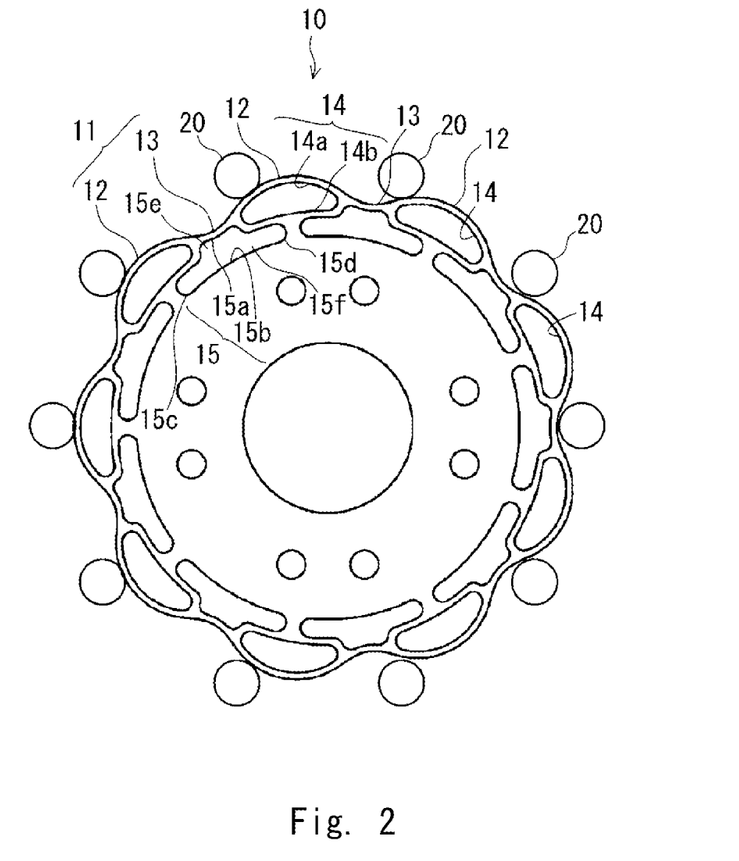
FIG. 2 shows a specific example 2 of through holes formed in a gear.

In order to satisfy this condition, it is desirable that the through holes 14 be provided in the plurality of tooth parts 12 and the tooth bottom parts 13 between the tooth parts 12 which are adjacent to each other, respectively (see, for example, FIG. 2). The shape and size of the through hole 14 in which the stress (or the force by which the gear 10 presses the outer peripheral pins 20 by the elastic force for returning the elastically deformed gear to the shape of the gear 10 before elastically deformed) generated by the elastic deformation becomes substantially constant can be found, for example, by performing a stress analysis (simulation) using a computer.

The third condition is that the gear 10 is not easily damaged even if the elastic deformation is repeated while the gear 10 is eccentrically rotated. In order to satisfy this condition, for example, it is desirable to perform chamfering (e.g., R chamfering) on both end parts of the through holes 14 in a radial direction (e.g., in FIG. 1, see the both end parts indicated by reference numerals 14c and 14d).

Next, a specific example of the through holes 14 satisfying the above three conditions (satisfying the conditions as much as possible) will be described.

<Specific Example 1 of Through Holes Formed in Gear>

As shown in FIG. 1, in a specific example 1, first through holes 14 formed in the tooth parts 12 are included.

As shown in FIG. 1, the first through hole 14 is a through hole that penetrates the gear 10 in the thickness direction (the direction orthogonal to the paper surface in FIG. 1), and is formed in each of the plurality of tooth parts 12.

In the radial direction, the first through hole 14 is formed between an arcuate surface 14a along the external teeth 11 and a first reference surface 14b (a first cylindrical surface).

In the circumferential direction, one end part 14c of the first through hole 14 extends to the vicinity of the tooth bottom part 13 adjacent to the one end part 14c, and another end part 14d of the first through hole 14 extends to the vicinity of the tooth bottom part 13 adjacent to the other end 14d. Chamfering (e.g., R chamfering) is applied to both end parts 14c and 14d of the first through hole 14 in the circumferential direction.

<Specific Example 2 of Through Holes Formed in Gear>

FIG. 2 shows a specific example 2 of the through holes formed in the gear.

As shown in FIG. 2, in the specific example 2, the first through holes 14 formed in the tooth parts 12 and second through holes 15 formed in the tooth bottom parts 13 are included.

Since the first through holes 14 have already been described, the second through holes 15 provided in the tooth bottom part 13 will be described below.

As shown in FIG. 2, the second through hole 15 is a through hole that penetrates the gear 10 in the thickness direction (the direction orthogonal to the paper surface in FIG. 2), and is formed in each of the tooth bottom parts 13 between the tooth parts 12 which are adjacent to each other.

In the radial direction, the second through hole 15 is formed between an arcuate surface 15a along the external teeth 11 and a second reference surface 15b (a second cylindrical surface coaxial with the first cylindrical surface and smaller than the first cylindrical surface).

The second through hole 15 includes a first hole part 15e and a second hole part 15f communicating with each other.

The first hole part 15e is formed in the tooth bottom part 13 between the tooth parts 12 which are adjacent to each other. The second hole part 15f is disposed on an inner side than the first hole part 15e in the circumferential direction of the gear 10. In the circumferential direction of the gear 10, the second hole part 15f extends toward the center of the first through hole 14 formed on both sides of the first hole part 15e. Chamfering (e.g., R chamfering) is applied to both end parts 15c and 15d of the second through hole 15 in the circumferential direction.

<Specific Example 3 of Through Holes Formed in Gear>

Figure 3:
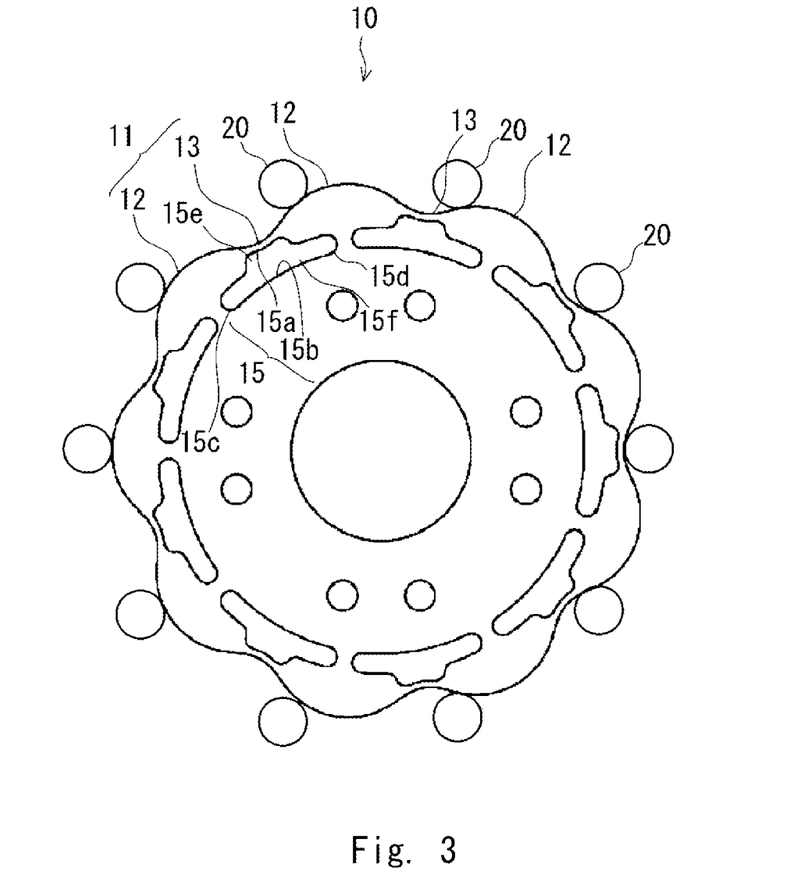
FIG. 3 shows a specific example 3 of the through holes formed in a gear.

FIG. 3 shows a specific example 3 of the through holes formed in a gear.

As shown in FIG. 3, in the specific example 3, second through holes 15 formed in the tooth bottom parts 13 are included.

<Configuration of Cycloidal Speed Reducer 1>

Next, the cycloidal speed reducer 1 using the gear 10 will be described.

Figure 4:
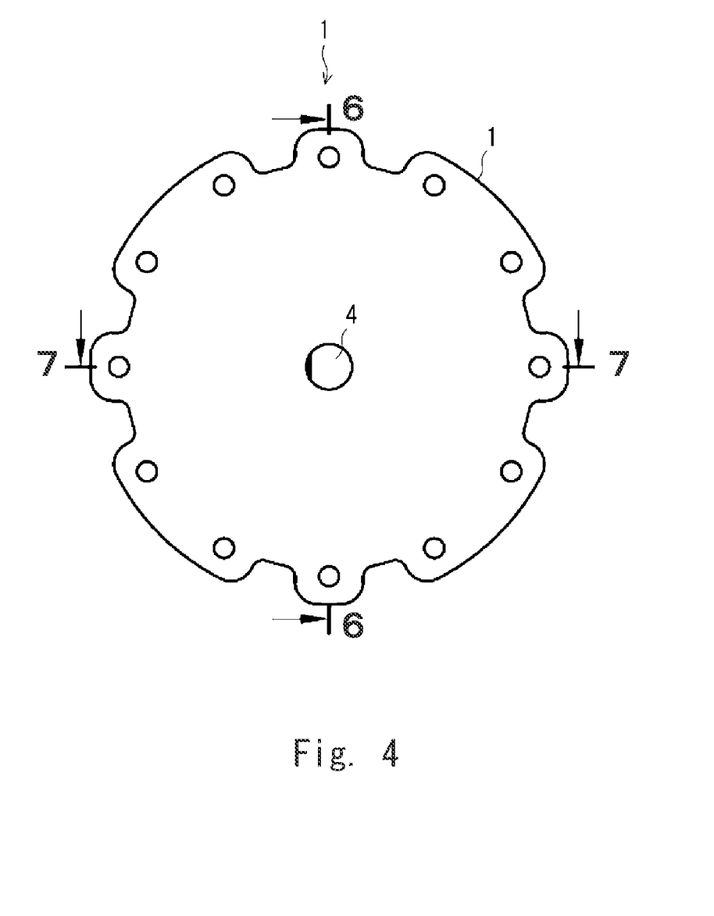
FIG. 4 is a front view of a cycloidal speed reducer 1.
Figure 5:
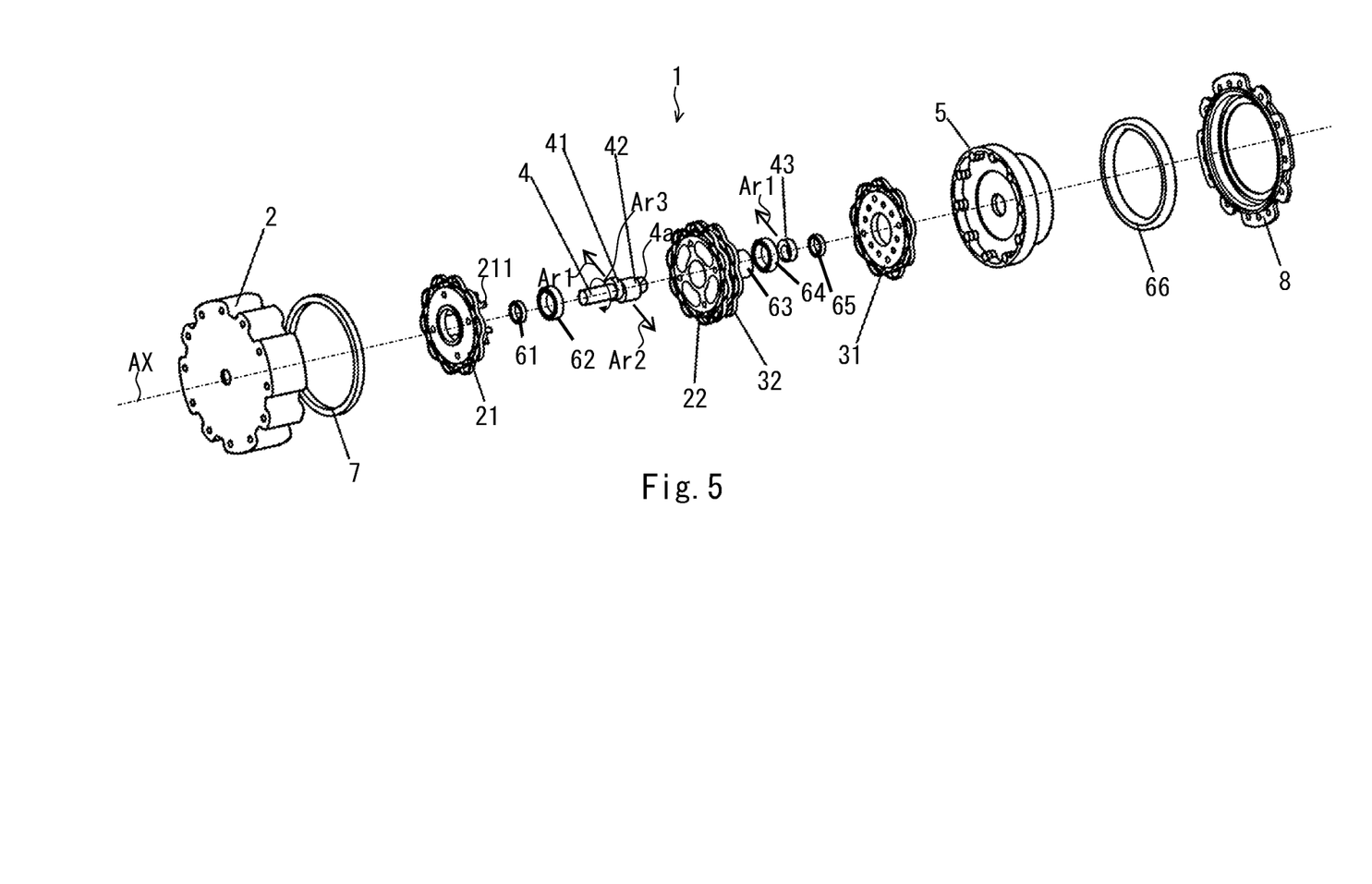
FIG. 5 is an exploded perspective view of the cycloidal speed reducer 1.
Figure 6:
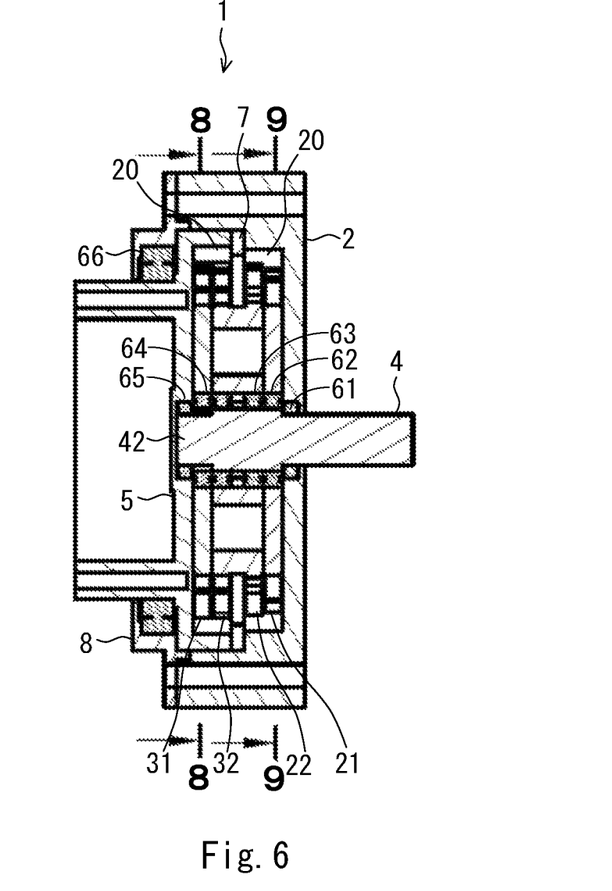
FIG. 6 is a cross-sectional view taken along the line 6-6 of FIG. 4.
Figure 7:
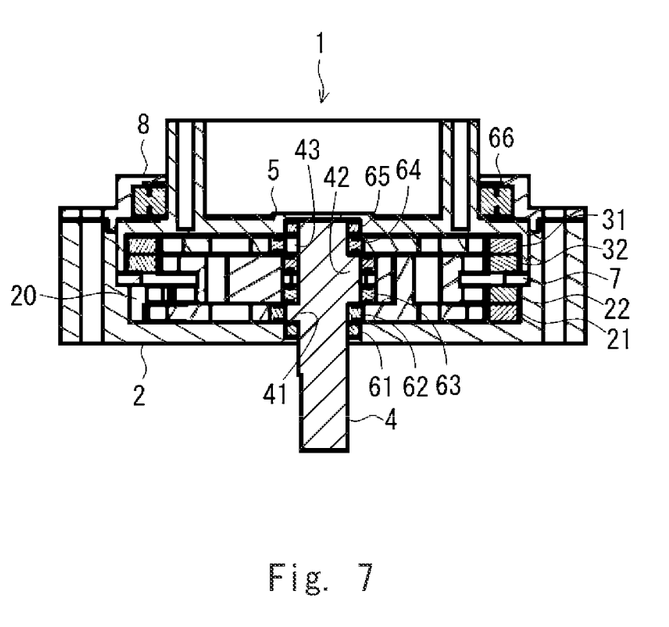
FIG. 7 is a cross-sectional view taken along the line 7-7 of FIG. 4.
Figure 8:
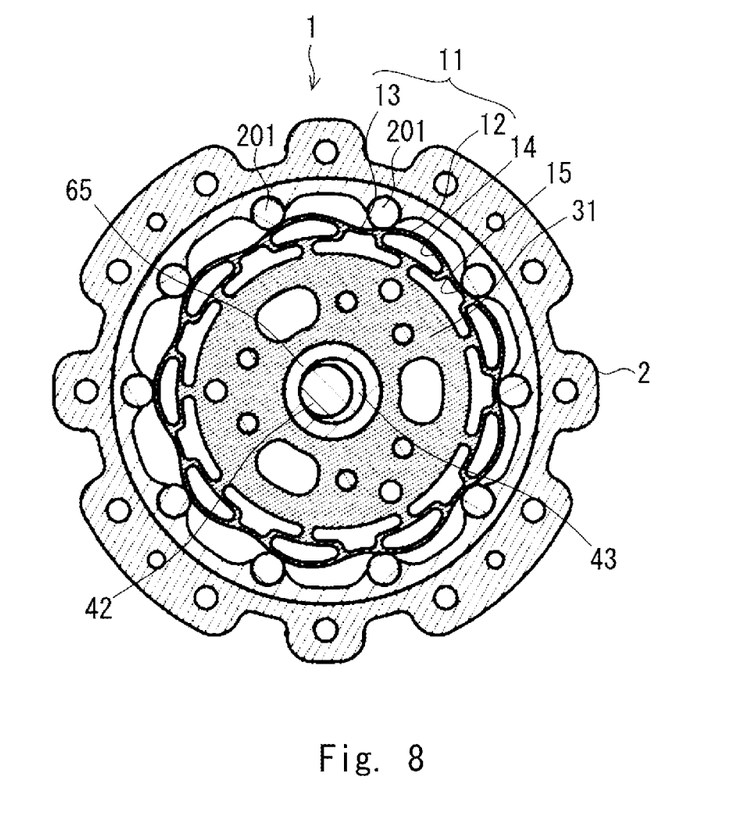
FIG. 8 is a cross-sectional view taken along the line 8-8 of FIG. 6.
Figure 9:
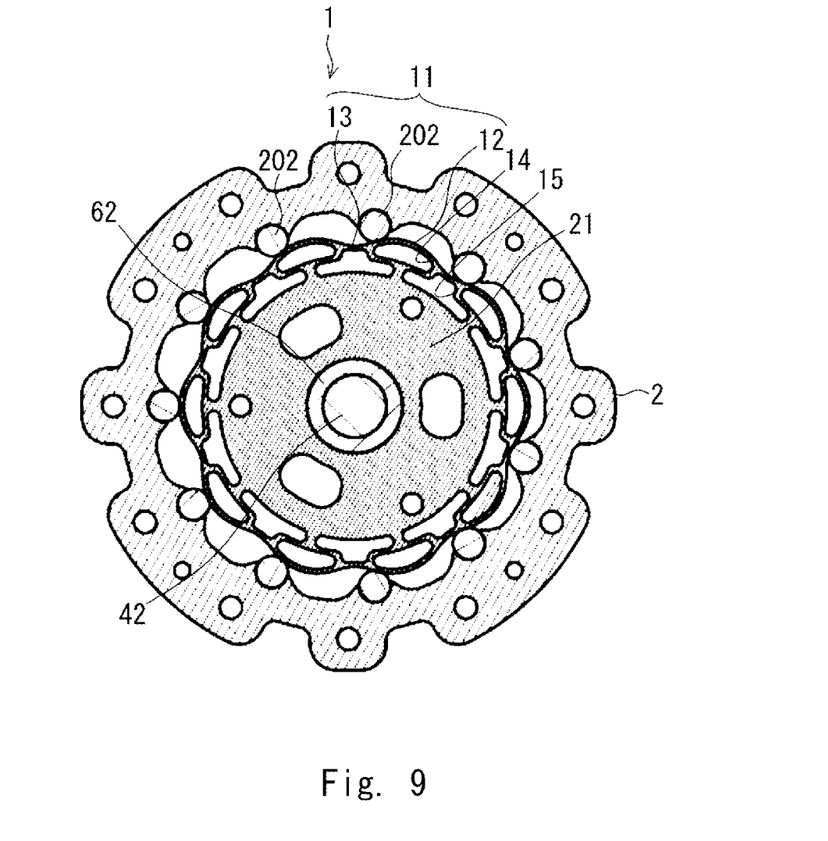
FIG. 9 is a cross-sectional view taken along the line 9-9 of FIG. 6.

FIG. 4 is a front view of the cycloidal speed reducer 1, FIG. 5 is an exploded perspective view, FIG. 6 is an cross sectional view of FIG. 4, FIG. 7 is a cross-sectional view taken along the line B-B of FIG. 4, FIG. 8 is a cross-sectional view taken along the line C-C of FIG. 6, and FIG. 9 is a cross-sectional view taken along the line D-D of FIG. 6.

As shown in FIGS. 5 to 9, the cycloidal speed reducer 1 mainly includes a housing 2, an input shaft 4, gears 21, 22, 31, and 32 (hereinafter referred to as a first gear 21, a second gear 22, a third gear 31, and a fourth gear 32, respectively) attached to the input shaft 4 (eccentric parts 41, 42, 43), an output shaft 5, and a lid 8 attached to the housing 2.

The input shaft 4 is a cylindrical shaft. The input shaft 4 includes a first eccentric part 41 and a second eccentric part 42 in the middle of the direction of a shaft AX (see FIG. 5). The first eccentric part 41 and the second eccentric part 42 are eccentric to the input shaft 4. Specifically, in FIG. 5, the eccentric direction of the first eccentric part 41 is the direction of an arrow AR1, and the eccentric direction of the second eccentric part 42 is in the direction of an arrow AR2, which are opposite to each other. The input shaft 4 is an example of a mechanism for eccentrically moving the first to fourth gears 21, 22, 31, and 32.

The third eccentric part 43 is attached to an end part 4a of the input shaft 4 on the output side. For example, the end part 4a of the input shaft 4 on the output side is press-fitted into the ring-shaped third eccentric part 43. The third eccentric part 43 is eccentric to the input shaft 4. The eccentric direction of the third eccentric part 43 is the same as the eccentric direction of the first eccentric part 41 (see arrow AR1 in FIG. 5).

The first to fourth gears 21, 22, 31, and 32 each have external teeth defined by a cycloid curve (an epitrochoid curve), similar to the gear 10 described above with reference to FIGS. 1 and 2. In the first to fourth gears 21, 22, 31, and 32, as in the gear 10 described with reference to FIGS. 1 and 2, the through holes 14 (the first through holes 14 and second through holes 15) satisfying the above three conditions are formed (see FIGS. 8 and 9).

The shapes and dimensions of the first gear 21 and the second gear 22 are identical to each other. The first gear 21 is attached to the first eccentric part 41 with a bearing 62 interposed therebetween. In FIG. 5, a reference numeral 61 denotes a fixing ring for fixing the bearing 62 to the first eccentric part 41. The second gear 22 is attached to the second eccentric shaft 42 with a bearing 63 interposed therebetween. As described above, since the eccentric direction of the first eccentric part 41 is opposite to the eccentric direction of the second eccentric part 42, the first gear 21 and the second gear 22 have a positional relationship in which the phases are shifted by 180°.

The shapes and dimensions of the third gear 31 and the fourth gear 32 are identical to each other.

The third gear 31 is attached to the third eccentric part 43 with a bearing 64 interposed therebetween. In FIG. 5, a reference numeral 65 denotes a fixing ring for fixing the bearing 64 to the third eccentric part 43. The fourth gear 32 is attached to the second eccentric shaft 42 with the bearing 63 interposed therebetween. Since the eccentric direction of the second eccentric part 42 and the eccentric direction of the third eccentric part 43 are opposite to each other as described above, the third gear 31 and the fourth gear 32 have a positional relationship in which the phases are shifted by 180°.

The second gear 22 and the fourth gear 32 are integrated (e.g., an integral product made by cutting a material). The second gear 22 and the fourth gear 32 may be assembled (e.g., an assembly manufactured by combining (e.g., welding) the second gear 22 and the fourth 32, which are separated from each other).

The first gear 21 and the third gear 31 are coupled to each other by connecting columns 211 (see FIG. 5). The plurality of connecting columns 211 are implanted on a surface of the first gear 21 facing the third gear 31. The connecting columns 211 pass through the through holes formed in each of the second gear 22 and the fourth gear 32, and leading end parts thereof are press-fitted into the through holes formed in the third gear 31. In this manner, the first gear 21 and the third gear 31 are coupled (integrated) to each other.

As shown in FIG. 8, the housing 2 is provided with a plurality of outer peripheral pins 201 which are brought into contact with the first gear 21 and the second gear 22 at equal intervals in the circumferential direction.

As shown in FIGS. 6 and 7, the output shaft 5 is attached to the lid 8 with a bearing 66 interposed therebetween. As shown in FIG. 9, the output shaft 5 is provided with a plurality of outer peripheral pins 202, which are to be brought into contact with the third gear 31 and the fourth gear 32, at equal intervals in the circumferential direction. In FIG. 5, a reference numeral 7 denotes a ring for pressing the outer peripheral pins 201 and 202.

<Operation of Cycloidal Speed Reducer 1>

Next, an operation example of the cycloidal speed reducer 1 having the above configuration will be described.

For example, in FIG. 5, the input shaft 4 is rotated clockwise (see an arrow AR3 in FIG. 5). Then, the first to third eccentric parts 41 to 43 eccentrically move. As a result, the first to fourth gears 21, 22, 31, 32 attached to the first to third eccentric parts 41 to 43 are eccentrically rotated counterclockwise.

Each of the first gear 21 and the second gear 22 is provided with the external teeth 11 defined by the cycloid curve projecting outward from the ideal cycloid curve, and the through holes 14 and 15 satisfying the above three conditions are formed in each of the first gear 21 and the second gear 22.

Therefore, each of the first gear 21 and the second gear 22 can be eccentrically rotated while being elastically deformed in a state in which the external teeth 11 are always in contact (pressure contact) with the plurality of outer peripheral pins 201 (see FIG. 8).

Similarly, each of the third gear 31 and the fourth gear 32 is a gear provided with the external teeth 11 defined by the cycloid curve projecting outward from the ideal cycloid curve, and the through holes 14 and 15 satisfying the above three conditions are formed in each of the third gear 31 and the fourth gear 32.

Therefore, each of the third gear 31 and the fourth gear 32 can be eccentrically rotated while being elastically deformed in a state in which the external teeth 11 are always in contact (pressure contact) with the plurality of outer peripheral pins 202 (see FIG. 9).

As described above, each of the first gear 21 and the second gear 22 is eccentrically rotated while being elastically deformed in a state in which the external teeth 11 are always in contact (press contact) with the plurality of outer peripheral pins 201 (see FIG. 8), and each of the third gear 31 and the fourth gear 32 is eccentrically rotated while being elastically deformed in a state in which the external teeth 11 are always in contact (press contact) with the plurality of outer peripheral pins 202 (see FIG. 9), so that the output shaft 5 rotates counterclockwise. In this manner, a gear mechanism with improved rotational efficiency is achieved.

<Reduction Rate of Cycloidal Speed Reducer 1>

Next, a reduction rate of the cycloidal speed reducer 1 will be described.

When the number of outer peripheral pins 201 provided on the housing 2 is $N_{in}$, the number of tooth parts 12 (see FIG. 8) of the first gear 21 and the second gear 22 is $N_{in}-1$. On the other hand, when the number of outer peripheral pins 202 provided on the output shaft 5 is Nom', the number of tooth parts 12 (see FIG. 9) of the third gear 31 and the fourth gear 32 is $N_{out}1$. In this case, the reduction rate is expressed by the following Formula 4. For example, when $N_{in}=11$ and $N_{out}=10$, the reduction rate is 1/100.

[Formula 4]

$$\text{reduction rate} = \frac{(N_{in} - N_{out})}{(N_{in} - 1) \cdot N_{out}} \quad \text{(Formula 4)}$$

As described above, according to this embodiment, the gears 10, 21, 22, 31, and 32 can be eccentrically rotated in a state in which the external teeth 11 defined by the cycloid curve are always in contact with the plurality of contacting members (the outer peripheral pins 20, 201, and 202).

This is because that the external teeth 11 defined by the cycloid curve projecting outward from the ideal cycloid curve which are in contact with the plurality of outer peripheral pins 20 (the peripheral pins 201 and 202) are provided, and the plurality of through holes 14 and 15 penetrating the gear 10 in the thickness direction of the gear are formed in the gear 10 (gear 21, 22, 31, and 32) in the circumferential direction of the gear 10 in order to elastically deform the gear 10 by the pressure contact.

Further, according to this embodiment, since the gear can be eccentrically rotated in a state in which the external teeth 11 defined by the cycloid curve are always in contact with the plurality of contacting members (the outer peripheral pins 20, 201, and 202), backlash on the output shaft side is prevented or minimized.

Further, according to this embodiment, since the gear can be eccentrically rotated in a state in which the external teeth 11 defined by the cycloid curve are always in contact (pressure contact) with the plurality of contacting members (the outer peripheral pins 20, 201, and 202), generation of noise caused by repetition of contact and non-contact between the external teeth 11 and the contacting members (the outer peripheral pins) is prevented or minimized.

Next, a modified example will be described.

In the above embodiment, an example in which the gear mechanism of the present disclosure is applied to the cycloidal speed reducer 1 has been described, but the present disclosure is not limited to this. For example, the gear mechanism according to the present disclosure may be applied to a transmission and other mechanisms.

In the above embodiment, the through holes formed in the gear 10 have been described with reference to FIGS. 1 to 3, but the present disclosure is not limited to this. That is, the through hole formed in the gear 10 may be a through hole formed so as to satisfy at least the three conditions (satisfying the conditions as much as possible), and through holes of various shapes and sizes can be used.

The numerical values shown in the above embodiment are all examples, and it is needless to say that any other suitable numerical value can be used.

The above embodiment are merely illustrative in all respects. The disclosure is not limited by the description of the above embodiments. The disclosure may be implemented in various other forms without departing from its spirit or principal features.

From the disclosure thus described, it will be obvious that the embodiment of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A gear mechanism comprising:
    a gear including external teeth, the external teeth including a plurality of tooth parts defined by a cycloid curve;
    a plurality of contacting members disposed on an outer side and in a circumferential direction of the external teeth, the external teeth being brought into pressure contact with the plurality of contacting members; and
    an input shaft configured to eccentrically move the gear, wherein
    in order to elastically deform the gear by the pressure contact, a plurality of through holes penetrating the gear in a thickness direction of the gear are formed in the gear in the circumferential direction of the gear, the plurality of through holes include first through holes and second through holes, the second through holes formed in tooth bottom parts between the tooth parts adjacent to each other,
    the cycloid curve extends without the external teeth interfering with the plurality of contacting members, and
    the gear is eccentrically rotated while being elastically deformed in a state in which the external teeth are always pressed against the plurality of contacting members.

2. The gear mechanism according to claim 1, wherein the through holes are formed at the external teeth.

3. The gear mechanism according to claim 1, wherein the through holes are such that stress generated by the elastic deformation becomes substantially constant regardless of positions of the external teeth which are brought into contact with the contacting members while the gear is eccentrically rotated.

4. The gear mechanism according to claim 1, wherein the first through holes are formed in the tooth parts.

5. The gear mechanism according to claim 1, wherein the second through hole includes a first hole part and a second hole part communicating with each other,
    the first hole part is formed in the tooth bottom part, and
    in a radial direction of the gear, the second hole part is located at an inner side than the first through hole, and in the circumferential direction of the gear, the second hole part extends toward a center of the first through hole formed on both sides of the first hole part in the circumferential direction of the gear.

6. A gear comprising external teeth, the external teeth including a plurality of tooth parts defined by a cycloid curve and the external teeth being brought into pressure contact with a plurality of contacting members disposed on an outer side and in a circumferential direction of the external teeth, wherein a plurality of through holes penetrating the gear in a thickness direction of the gear are formed in the gear in the circumferential direction of the gear in order to elastically deform the gear by the pressure contact, the plurality of through holes include first through holes and second through holes, the second through holes formed in tooth bottom parts between the tooth parts adjacent to each other, and the cycloid curve extends without the external teeth interfering with the plurality of contacting members.

\* \* \* \* \*